US012139945B2

(12) United States Patent
Hook et al.

(10) Patent No.: US 12,139,945 B2
(45) Date of Patent: Nov. 12, 2024

(54) HINGE APPARATUS

(71) Applicant: JAGUAR LAND ROVER LIMITED, Whitley Coventry (GB)

(72) Inventors: Nicholas Hook, Whitley Coventry (GB); David Rathbone, Whitley Coventry (GB); Jim Johnston, Whitley Coventry (GB); Mark Langstone, Whitley Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 525 days.

(21) Appl. No.: 17/593,440

(22) PCT Filed: Mar. 9, 2020

(86) PCT No.: PCT/EP2020/056161
§ 371 (c)(1),
(2) Date: Sep. 17, 2021

(87) PCT Pub. No.: WO2020/187618
PCT Pub. Date: Sep. 24, 2020

(65) Prior Publication Data

US 2022/0178186 A1 Jun. 9, 2022

(30) Foreign Application Priority Data

Mar. 19, 2019 (GB) ..................................... 1903720

(51) Int. Cl.
*E05D 15/10* (2006.01)
*B60J 5/04* (2006.01)
(Continued)

(52) U.S. Cl.
CPC ........... *E05D 15/101* (2013.01); *E05D 3/147* (2013.01); *E05D 11/1028* (2013.01);
(Continued)

(58) Field of Classification Search
CPC ......... E05Y 2201/462; E05Y 2900/506; E05Y 2900/51; E05Y 2900/531; E05D 15/101;
(Continued)

(56) References Cited

U.S. PATENT DOCUMENTS 6,183,039 B1 * 2/2001 Kohut ................. E05D 15/1081 296/146.12
6,447,054 B1 * 9/2002 Pietryga .................. E05D 3/147 296/146.12
(Continued)

FOREIGN PATENT DOCUMENTS

DE 3917967 A1 8/1990
DE 4411694 A1 10/1995
(Continued)

OTHER PUBLICATIONS

Great Britain Intellectual Property Office, Combined Search and Examination Report under Sections 17 and 18(3) Issued in Application No. GB1903720.9, Aug. 20, 2019, 7 pages.
(Continued)

*Primary Examiner* — Gregory A Blankenship
(74) *Attorney, Agent, or Firm* — McCoy Russell LLP

(57) ABSTRACT

Aspects of the present invention relate to hinge apparatus for supporting an aperture closure member. The hinge apparatus is configurable in at least first and second configurations. The hinge apparatus includes a first hinge bracket and a second hinge bracket. A first hinge linkage member is pivotally mounted to each of the first and second hinge brackets. A second hinge linkage member is pivotally mounted to each of the first and second hinge brackets. A latching mechanism is provided for selectively latching the hinge apparatus. The latching mechanism is operable to inhibit movement of the first and second hinge linkage members relative to each other to latch the hinge apparatus. The present invention also relates to a carrier assembly for
(Continued)

carrying an aperture closure member; and a vehicle having a carrier assembly.

17 Claims, 7 Drawing Sheets

(51) Int. Cl.
*E05D 3/14* (2006.01)
*E05D 11/10* (2006.01)

(52) U.S. Cl.
CPC ... *E05Y 2201/462* (2013.01); *E05Y 2900/506* (2013.01); *E05Y 2900/51* (2013.01); *E05Y 2900/531* (2013.01)

(58) Field of Classification Search
CPC ........ E05D 11/1028; E05D 3/147; B60J 5/06; B60J 5/062; B60J 5/047
See application file for complete search history.

(56) References Cited

U.S. PATENT DOCUMENTS

| | | | | |
|---|---|---|---|---|
| 7,774,900 | B2 * | 8/2010 | Shaw | E05D 11/1057 296/193.11 |
| 2006/0277829 | A1 | 12/2006 | Kiefer | |
| 2008/0222844 | A1 * | 9/2008 | Broadhead | E05D 3/16 16/366 |
| 2010/0171336 | A1 * | 7/2010 | Elliott | B60J 5/06 296/146.12 |
| 2010/0301631 | A1 * | 12/2010 | Scott | E05D 3/127 296/146.12 |
| 2011/0010998 | A1 * | 1/2011 | Elliott | E05D 15/101 49/260 |
| 2011/0135826 | A1 * | 6/2011 | Heuel | B60J 5/06 296/202 |
| 2016/0237733 | A1 * | 8/2016 | Henseleit | E05D 15/28 |
| 2016/0362920 | A1 * | 12/2016 | Dey | E05D 3/127 |
| 2019/0168705 | A1 * | 6/2019 | Springsklee | E05D 3/147 |
| 2020/0378171 | A1 * | 12/2020 | Reiter | E05D 15/32 |
| 2022/0106822 | A1 * | 4/2022 | Yun | B60J 5/047 |
| 2022/0178186 | A1 * | 6/2022 | Hook | E05D 15/101 |

FOREIGN PATENT DOCUMENTS

| | | | |
|---|---|---|---|
| DE | 102007053994 | A1 | 5/2009 |
| DE | 102013227005 | A1 | 9/2014 |
| EP | 2072729 | A1 | 6/2009 |
| NO | 323893 | B1 | 7/2007 |

OTHER PUBLICATIONS

ISA European Patent Office, International Search Report and Written Opinion Issued in Application No. PCT/EP2020/056161, Jun. 17, 2020, WIPO, 12 pages.

Great Britain Intellectual Property Office, Examination Report under Section 18(3) Issued in Application No. GB1903720.9, Aug. 18, 2021, 5 pages.

* cited by examiner

HINGE APPARATUS

CROSS REFERENCE TO RELATED APPLICATIONS

The present application is a U.S. National Phase of International Application No. PCT/EP2020/056161 entitled "HINGE APPARATUS," and filed on Mar. 9, 2020. International Application No. PCT/EP2020/056161 and claims priority to Great Britain Patent Application No. 1903720.9 filed on Mar. 19, 2019. The entire contents of each of the above-listed applications are hereby incorporated by reference for all purposes.

TECHNICAL FIELD

The present disclosure relates to a hinge apparatus. Aspects of the disclosure relate to a hinge apparatus, a carrier assembly comprising at least one hinge apparatus, and a vehicle.

BACKGROUND AND SUMMARY

It is known to utilise pantographic hinge devices in a sliding door of a vehicle, such as an omnibus (bus) or a train. The sliding door may have to move in a transverse direction and also in a longitudinal direction relative to the vehicle. The pantographic hinge devices can provide the desired movement of the door. The pantographic hinge device comprises separate latching mechanisms to secure the door in open and closed positions.

It is an aim of the present disclosure to address one or more of the disadvantages associated with the prior art.

Aspects and embodiments of the disclosure provide a hinge apparatus, a carrier assembly comprising a hinge apparatus and a vehicle.

According to an aspect of the present disclosure there is provided a hinge apparatus for supporting an aperture closure member, the hinge apparatus being configurable in at least first and second configurations, the hinge apparatus comprising:

a first hinge bracket;

a second hinge bracket;

a first hinge linkage member pivotally mounted to each of the first and second hinge brackets;

a second hinge linkage member pivotally mounted to each of the first and second hinge brackets; and a latching mechanism for selectively latching the hinge apparatus;

wherein the latching mechanism is operable to inhibit movement of the first and second hinge linkage members relative to each other to latch the hinge apparatus. By inhibiting movement of the first and second hinge linkage members relative to each other, the latching mechanism may latch the hinge apparatus. The latching mechanism may be operable to latch the hinge apparatus in one or more configurations. The latching mechanism may be operable to make fast the hinge apparatus in one or more configurations. At least in certain embodiments, the latching mechanism may be operable selectively to latch the hinge apparatus in the first configuration and the second configuration. The latching mechanism may controllably latch the hinge apparatus in one of the first configuration and the second configuration. The latching mechanism may be operable selectively to fasten or retain the hinge apparatus at least in the first configuration and the second configuration. The latching mechanism may provide a dual latching function. The latching mechanism may operate to lock the hinge apparatus. The latching mechanism may be operable to latch the first and second hinge linkage members to each other. For example, the latching mechanism may be operable to fasten the first and second hinge linkage members to each other, thereby inhibiting relative movement of the first and second hinge linkage members.

The first and second hinge brackets and the first and second hinge linkage members effectively form a four-bar linkage assembly. The hinge apparatus may be in the form of a pantographic hinge.

The latching mechanism may comprise a mechanical or electromechanical latch. For example, a latch member may deploy to connect the first and second hinge linkage members when the hinge apparatus is in the first configuration and/or the second configuration. A release mechanism, for example comprising an electromechanical actuator, may be provided to release the latch member. In use, the latching member may selectively latch and release the hinge apparatus.

The latching mechanism may comprise at least one permanent magnet. The latching mechanism may be released by application of a force greater than the attractive force of the at least one permanent magnet.

The latching mechanism may comprise at least one electromagnet. The at least one electromagnet may be provided in one of the first and second hinge linkage members. The latching mechanism may latch the hinge apparatus by energizing the at least one electromagnet. The latching mechanism may release the hinge apparatus by de-energizing the at least one electromagnet.

The electrical current supplied to the at least one electromagnet may be adjusted to control a latching force generated by the latching mechanism. A first electrical current may be supplied to generate a first latching force; and a second electrical current may be supplied to generate a second latching force. The first latching force may be smaller than the second latching force. The first latching force may be generated to provide an assistive or biasing force, for example to provide a momentary stop during operation of the hinge apparatus. The second latching force may lock the hinge apparatus to prevent operation of the hinge apparatus.

The at least one electromagnet may be disposed on one of the first and second hinge linkage members. The at least one electromagnet could be configured to interact with the other of the first and second hinge linkage members, for example if the hinge linkage members are composed of a ferromagnetic material. The latching mechanism may comprise at least one permanent magnet. The at least one electromagnet may be configured to interact with the at least one permanent magnet. Alternatively, at least a first ferromagnetic member may be disposed on the other of the first and second hinge linkage members for cooperating with the electromagnet. The first and second hinge linkage members may be configured such that the electromagnet and the first ferromagnetic member are disposed proximal to each other when the hinge apparatus is configured in one or more of the at least first and second configurations. The electromagnet and the first ferromagnetic member may be disposed adjacent to each other when the hinge apparatus is in the first configuration. Alternatively, or in addition, the electromagnet and the first ferromagnetic member may be disposed adjacent to each other when the hinge apparatus is in the second configuration. A second ferromagnetic member may be disposed on the second hinge linkage member. The electromagnet and the second ferromagnetic member may be disposed adjacent to each other when the hinge apparatus is in the second configuration.

The at least one electromagnet may be disposed on one of the first and second hinge linkage members. A permanent magnet could be provided on the other one of the first and second hinge linkage members. Alternatively, a separate electromagnet may be disposed on the other one of the first and second hinge linkage members. The electromagnets on the first and second hinge linkage members could be controlled to provide different control functions. The electromagnets could be energized to have the same polarity (to repel each other). Alternatively, the electromagnets could be energized to have opposite polarities (to attract each other). The polarity of the electromagnets could be controlled to bias the first and second hinge linkage members away from each other, for example to initiate operation of the hinge apparatus or to provide a soft close function. The polarity of the electromagnets could be controlled to bias the first and second hinge linkage members towards each other, for example to assist in operation of the hinge apparatus or to latch the hinge apparatus.

The hinge apparatus may comprise a controller configured to control operation of the at least one electromagnet.

The second hinge bracket may be configured to move between a first position and a second position relative to the first hinge bracket as the hinge apparatus is operated. The movement of the second hinge bracket may comprise or consist of a translational movement.

The hinge apparatus may comprise a linear travel assembly for mounting the aperture closure device. The linear travel assembly may be disposed on the second hinge bracket. The aperture closure device may comprise one or more linear guides for cooperating with the linear travel assembly. The linear guide may comprise a track or rail.

The hinge apparatus may comprise a pantographic hinge apparatus.

The hinge apparatus may comprise a first actuator for configuring the hinge apparatus in the first and second configurations. The first actuator may comprise a first electric machine.

The first and second configurations may correspond to end positions of the hinge apparatus. For example, one of the first and second configurations may correspond to a closed configuration and the other one of the first and second configurations may correspond to an open configuration.

According to a further aspect of the present disclosure there is provided a carrier assembly comprising at least one hinge apparatus as described herein.

The carrier assembly may comprise first hinge apparatus and second hinge apparatus. The first and second hinge apparatus may be offset from each other in at least first and second directions. The first and second hinge apparatus may be offset from each other in a first direction along a pivot axis of the first and second hinge linkage members. The second direction may be perpendicular to the first direction. The second direction may, for example, be a transverse direction or a longitudinal direction.

The carrier assembly may comprise a bracing member. The bracing member may connect the first and second hinge apparatus. The bracing member may connect the second hinge bracket of each of the first and second hinge apparatus.

The carrier assembly may comprise a linear travel assembly for providing linear movement of the aperture closure member. The linear travel assembly may provide a sliding mechanism for operation of the aperture closure member. The linear travel assembly may, for example, comprise at least one linear bearing and a track or rail for guiding movement of the aperture closure member. The linear travel assembly may be disposed on the hinge apparatus. The latching mechanism may be operated to latch the hinge apparatus in position to enable operation of the linear travel assembly. The latching mechanism may be operated to secure the hinge apparatus and reduce or prevent movement of the linear travel assembly. The hinge apparatus may be latched in the first and second configurations to allow the aperture closure member to be held stationary in both states. This function could also stop the hinge apparatus attempting to close during operation of the aperture closure member. By securing the hinge apparatus, smooth movement of the aperture closure member may be achieved.

According to a further aspect of the present disclosure there is provided a vehicle comprising at least one hinge apparatus of the type described herein.

According to a further aspect of the present disclosure there is provided a vehicle comprising at least one carrier assembly of the type described herein. The vehicle may comprise one or more aperture closure member. Each aperture closure member may comprise a vehicle door.

Within the scope of this application it is expressly intended that the various aspects, embodiments, examples and alternatives set out in the preceding paragraphs, in the following description and drawings, and the individual features thereof, may be taken independently or in any combination. That is, all embodiments and/or features of any embodiment can be combined in any way and/or combination, unless such features are incompatible.

BRIEF DESCRIPTION OF THE FIGURES

One or more embodiments of the disclosure will now be described, by way of example only, with reference to the accompanying drawings, in which.

DETAILED DESCRIPTION

A vehicle 1 having a door carrier assembly 2 comprising a hinge apparatus 3-*n* in accordance with an embodiment of the present disclosure will now be described with reference to the accompanying figures. The door carrier assembly 2 comprises a first hinge apparatus 3-1 and a second hinge apparatus 3-2 for supporting a vehicle door 4. The first and second hinge apparatus 3-1, 3-2 are each in the form of a pantographic hinge device. In the present embodiment, the door carrier assembly 2 is configured also to provide longitudinal movement of the vehicle door 4.

Figure 1:
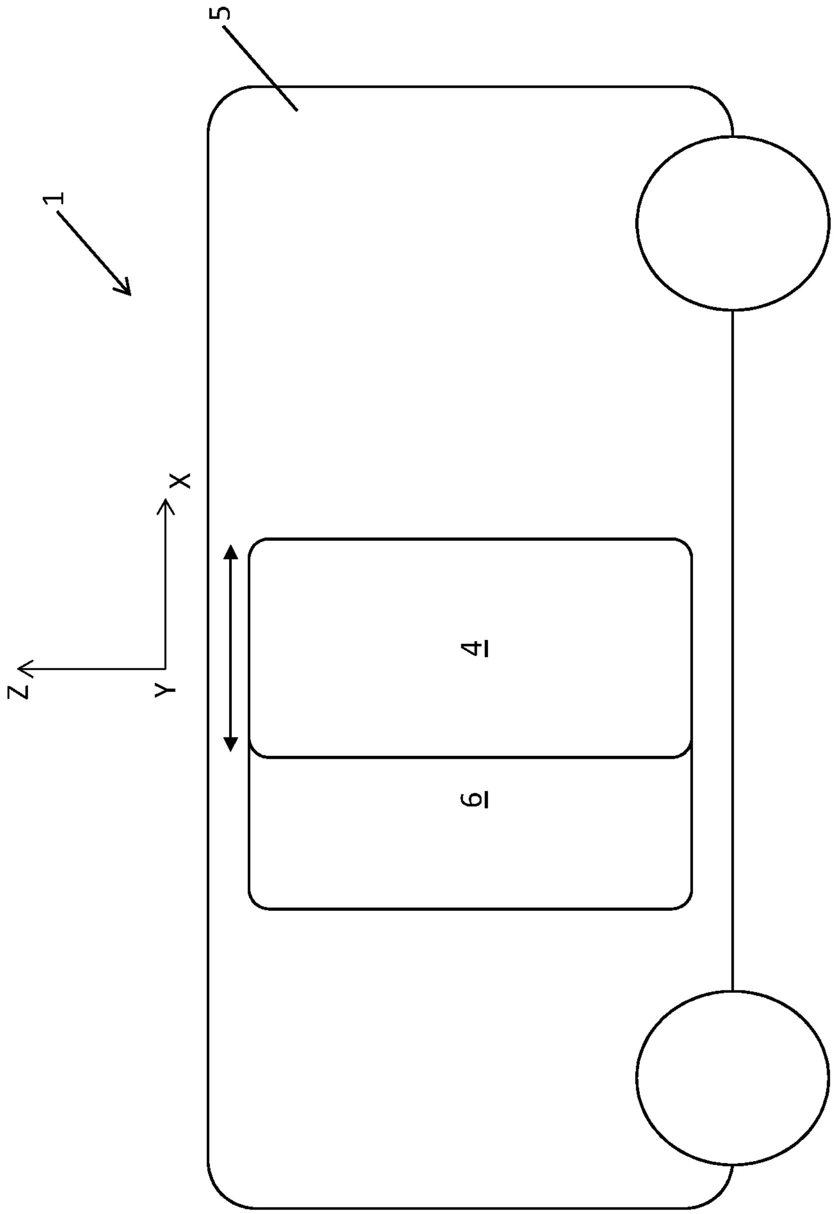
FIG. 1 shows a schematic representation of a vehicle having a door carrier assembly comprising hinge apparatus in accordance with an embodiment of the present disclosure.

The vehicle 1 in the present embodiment is a road vehicle, such as an omnibus (a bus), or a shuttle vehicle. In a variant, the vehicle 1 could be an automobile, a utility vehicle, a sports utility vehicle or a truck. The vehicle 1 could operate on rails, for example, a train or a tram; or the vehicle 1 could be a vessel for transport by water, such as a yacht. As shown in FIG. 1, the vehicle 1 is described herein with reference to a frame comprising a longitudinal axis X, a transverse axis Y and a vertical axis Z.

Figure 2:
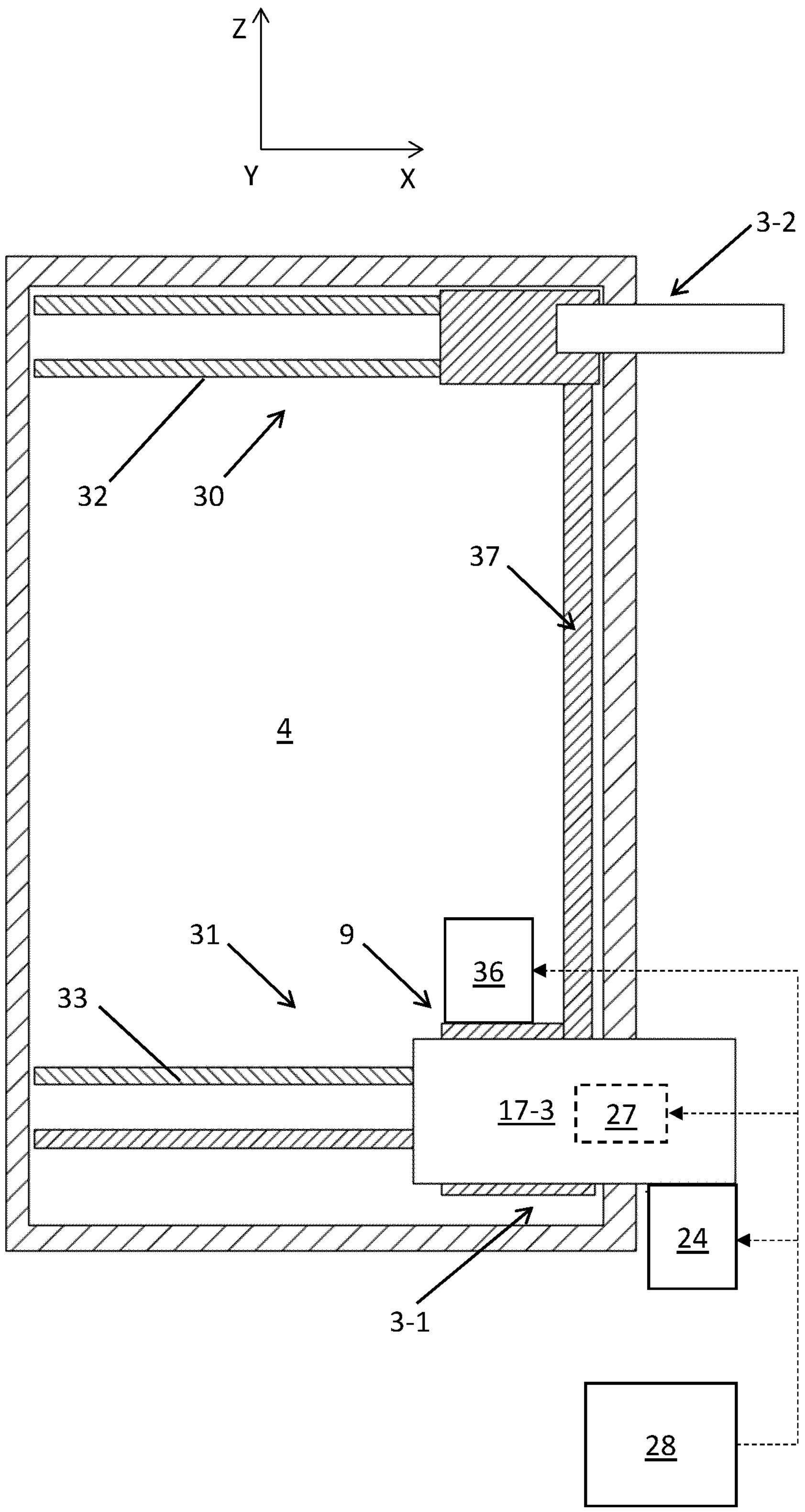
FIG. 2 shows a side elevation of the door carrier assembly and the vehicle door shown in FIG. 1.

The vehicle 1 comprises a body 5 having at least one door aperture 6 (a single door aperture 6 is shown in FIG. 1). A vehicle door 4 is associated with the door aperture 6. The vehicle door 4 can be moved between an open position and a closed position to enable ingress to and egress from the vehicle 1. As shown in FIG. 2, the vehicle door 4 is supported by the first and second hinge apparatus 3-1, 3-2. As described herein, the first and second hinge apparatus 3-1, 3-2 are configured to operate in unison during opening and closing of the vehicle door 4. The first hinge apparatus 3-1 forms a lower hinge which is fastened to the body 5 at the bottom of the door aperture 6. The second hinge apparatus 3-2 forms an upper hinge which is fastened to the body 5 at the top of the door aperture 6. The first hinge apparatus 3-1 functions as a primary hinge which supports a greater proportion of the operational loads; and the second hinge apparatus 3-2 functions as a secondary hinge which helps to guide the movement of the vehicle door 4 The first and second hinge apparatus 3-1, 3-2 are configured such that movement of the vehicle door 4 at least substantially consists of a translational movement (with little or no pivoting or rotational movement). In use, the orientation of the vehicle door 4 relative to the body 5 remains substantially unchanged.

The first hinge apparatus 3-1 and the second hinge apparatus 3-2 are each configurable in at least first and second configurations. When the first hinge apparatus 3-1 and the second hinge apparatus 3-2 are in their respective first configurations, the vehicle door 4 is in the closed position. When the first hinge apparatus 3-1 and the second hinge apparatus 3-2 are in their respective second configurations, the vehicle door 4 is in an intermediate position (i.e. a partially open position). In the intermediate position, the vehicle door 4 is spaced apart from the body 5 in a transverse direction. In the present embodiment, the vehicle door 4 is spaced apart from the body 5 sufficiently to enable longitudinal movement of the vehicle door 4 without impinging on the body 5. The longitudinal movement of the vehicle door 4 is implemented by a linear travel assembly 9 supported by the first and second hinge apparatus 3-1, 3-2. The linear travel assembly 9 is described in more detail herein. In a variant, the first and second hinge apparatus 3-1, 3-2 could be configured such that the vehicle door 4 in the open position when the first hinge apparatus 3-1 and the second hinge apparatus 3-2 are in their respective second configurations.

The first and second hinge apparatus 3-1, 3-2 have generally the same configuration. The first hinge apparatus 3-1 will now be described with reference to FIGS. 4 to 7. The first hinge apparatus 3-1 is shown in the first configuration in FIGS. 4 and 5, and in the second configuration in FIGS. 6 and 7. The first hinge apparatus 3-1 comprises a first hinge bracket 10 for mounting to the body 5; and a second hinge bracket 11 to which the vehicle door 4 is mounted. The first hinge bracket 10 has a first mounting surface 12 for mounting to an inner surface (not shown) of the body 5. The second hinge bracket 11 has a second mounting surface 13 for mounting the linear travel assembly 9. In the present embodiment, mechanical fasteners are used to mount the first hinge apparatus 3-1. The first and second hinge brackets 10, 11 each have a plurality of apertures (denoted generally by the reference numeral 14) for receiving mechanical fasteners. Other fastening techniques are contemplated for mounting the first hinge apparatus 3-1.

Figure 5:
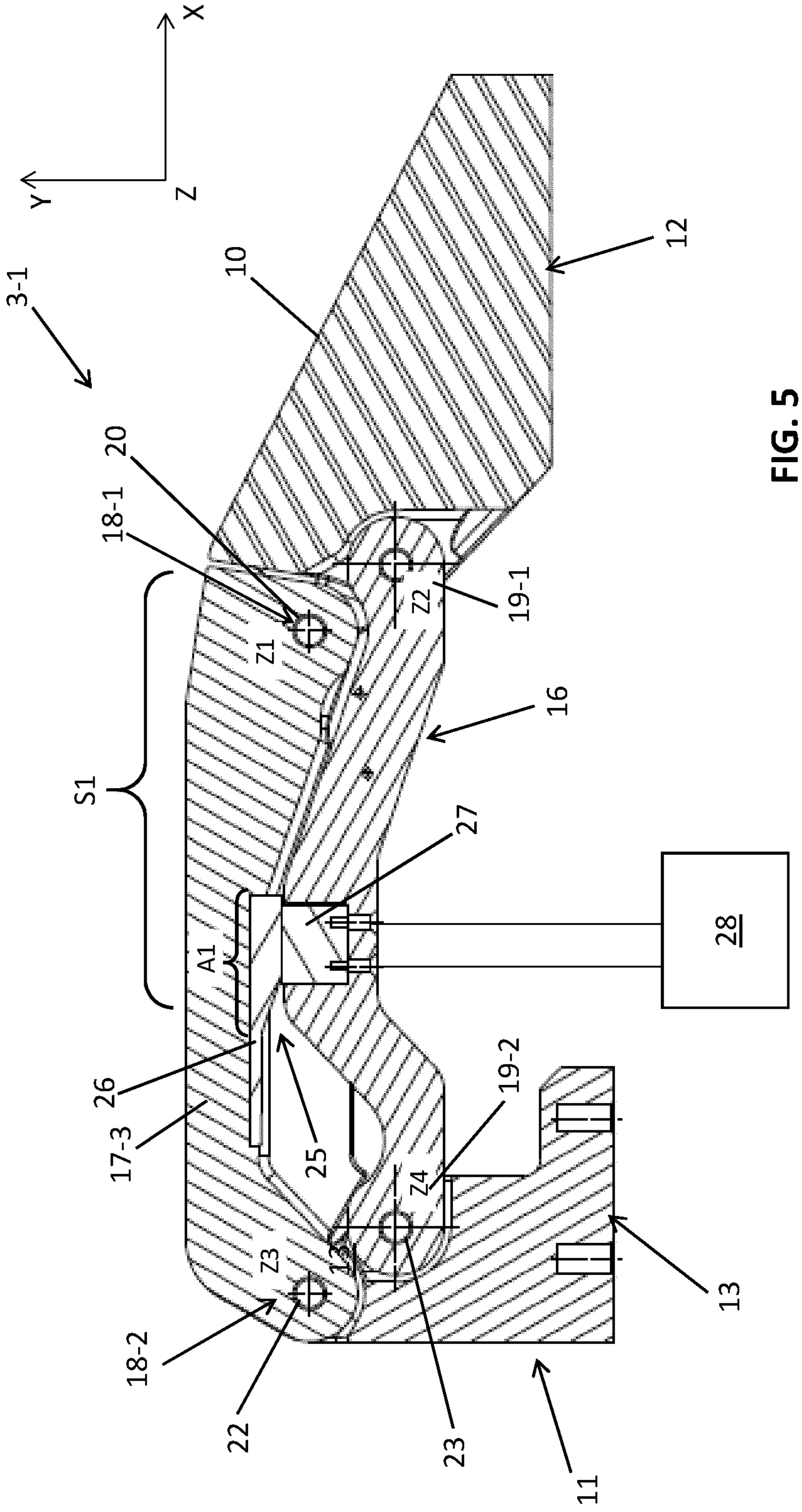
FIG. 5 shows a longitudinal sectional view of the first hinge apparatus shown in FIG. 4 in the first configuration.
Figure 6:
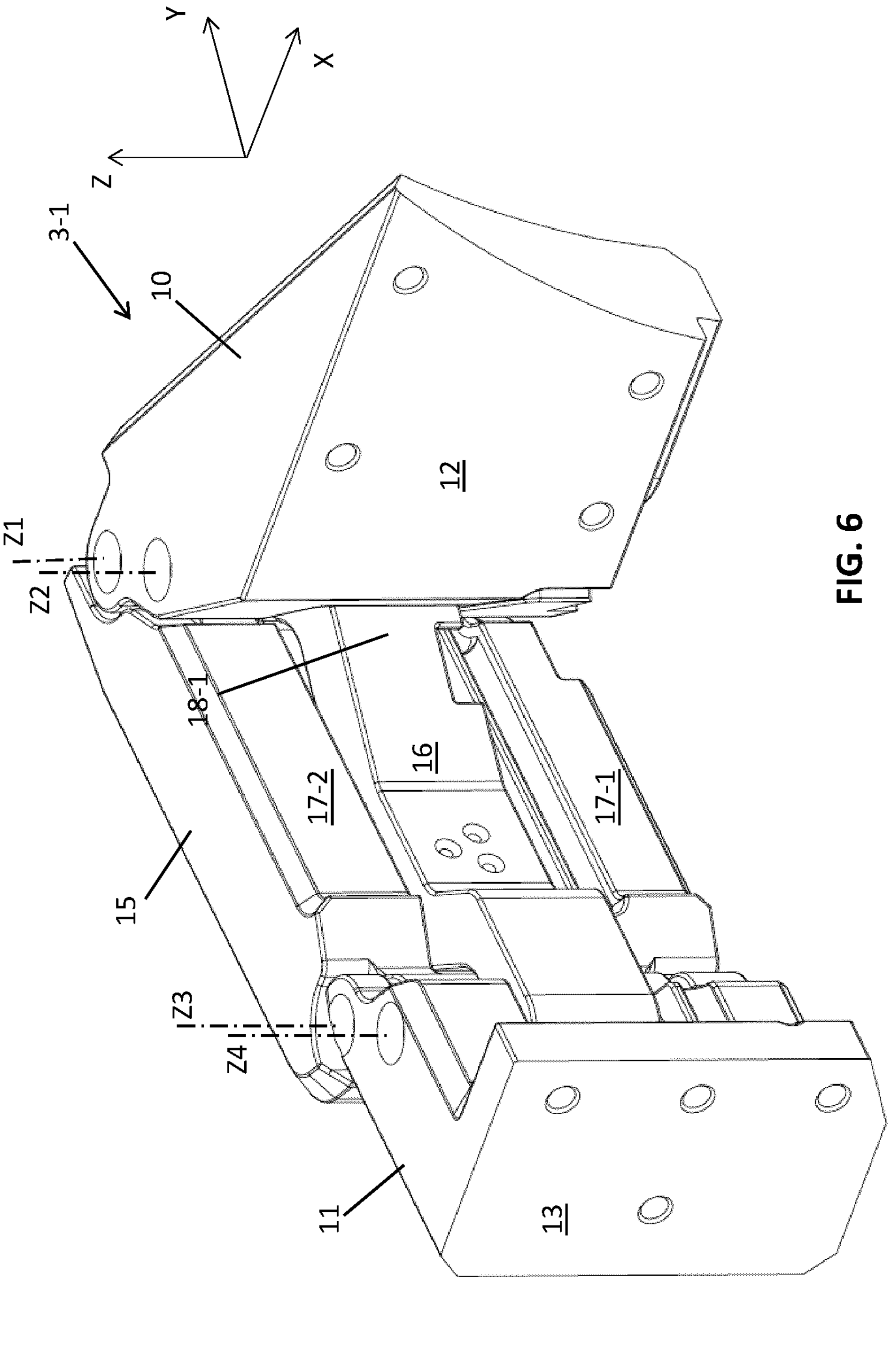
FIG. 6 shows a perspective view of a first hinge apparatus in the door carrier assembly in a second configuration.
Figure 7:
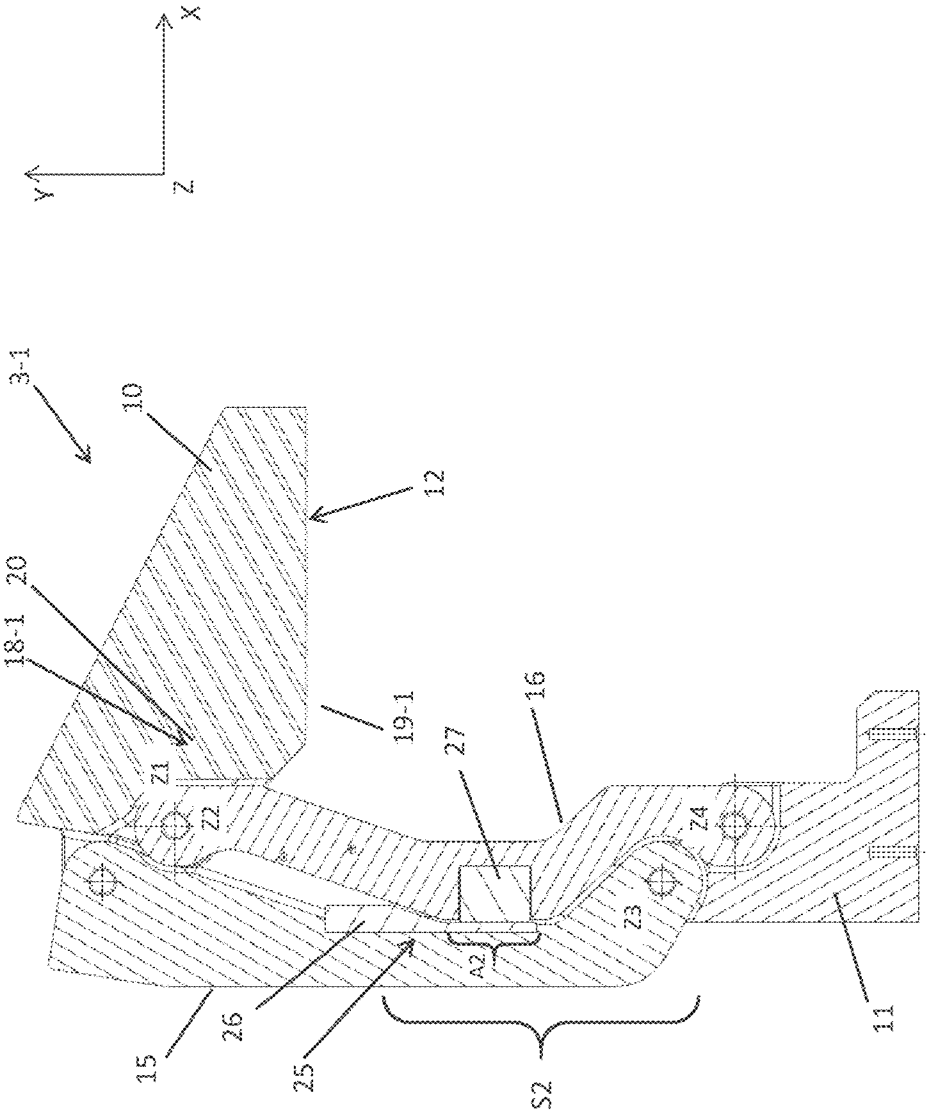
FIG. 7 shows a longitudinal sectional view of the first hinge apparatus shown in FIG. 4 in the second configuration.

The first hinge apparatus 3-1 comprises a first hinge linkage member 15 and a second hinge linkage member 16. The first and second hinge linkage members 15, 16 are formed of metal. The first hinge linkage member 15 comprises first and second lateral supports 17-1, 17-2 and an outer plate 17-3. The first hinge linkage member 15 has a unitary composition and the first and second lateral supports 17-1, 17-2 and the outer plate 17-3 are formed integrally. As shown in FIG. 5, the first and second lateral supports 17-1, 17-2 form first connectors 18-1, 18-2 at opposing ends of the first hinge linkage member 15. The second hinge linkage member 16 comprises second connectors 19-1, 19-2 disposed at opposing ends thereof. The second hinge linkage member 16 is at least partially received in a region between the first and second lateral supports 17-1, 17-2. As shown in FIGS. 5 and 6, the first and second hinge linkage members 15, 16 have complementary profiles. When the first hinge apparatus 3-1 is in the first configuration a first section 51 of the second hinge linkage member 16 is disposed in a face-to-face arrangement with the first hinge linkage member 15. When the first hinge apparatus 3-1 is in the second configuration a second section S2 of the second hinge linkage member 16 is disposed in a face-to-face arrangement with the first hinge linkage member 15.

The first hinge linkage member 15 is pivotally mounted to the first hinge bracket 10 by a first pivot pin 20 defining a first pivot axis Z1. The second hinge linkage member 16 is pivotally mounted to the first hinge bracket 10 by a second pivot pin 21 defining a second pivot axis Z2. The first hinge bracket 10 comprises first rotary bearings (not shown) for mounting the first and second pivot pins 20, 21. The first hinge linkage member 15 is pivotally mounted to the second hinge bracket 11 by a third pivot pin 22 defining a third pivot axis Z3. The second hinge linkage member 16 is pivotally mounted to the second hinge bracket 11 by a fourth pivot pin 23 defining a fourth pivot axis Z4. The second hinge bracket 11 comprises second rotary bearings (not shown) for mounting the third and fourth pivot pins 22, 23. The first and second hinge linkage members 15, 16 have the same effective length (i.e. the distance between first and third pivot axes Z1, Z3 is the same as the distance between the second and fourth pivot axes Z2, Z4). The first, second, third and fourth pivot axes Z3-Z4 are substantially parallel to each other. In the present embodiment, the first, second, third and fourth pivot axes Z3-Z4 are substantially parallel to the vertical axis Z of the reference frame, but other orientations contemplated. The first pivot axis Z1 and the second pivot axis Z2 are offset from each in longitudinal and transverse directions. There is a corresponding offset between the third pivot axis Z3 and the fourth pivot axis Z4.

A first actuator 24 is provided for actuating the first hinge apparatus 3-1, as shown in FIG. 2. In the present embodiment, the first actuator 24 comprises a first electrical motor which drivingly rotates the first hinge linkage member 15 about the first pivot axis Z1. In use, the second hinge bracket 11 pivots relative to the first and second hinge linkage members 15, 16 as the first hinge apparatus 3-1 is operated. However, the orientation of the second hinge bracket 11 remains substantially unchanged relative to the first hinge bracket 10. The first hinge apparatus 3-1 is configured such that the movement of the second hinge bracket 11 is at least substantially exclusively a translational movement. In the present embodiment, the second mounting surface 13 defined by the second hinge bracket 11 remains substantially parallel to the longitudinal axis X of the vehicle 1.

Figure 4:
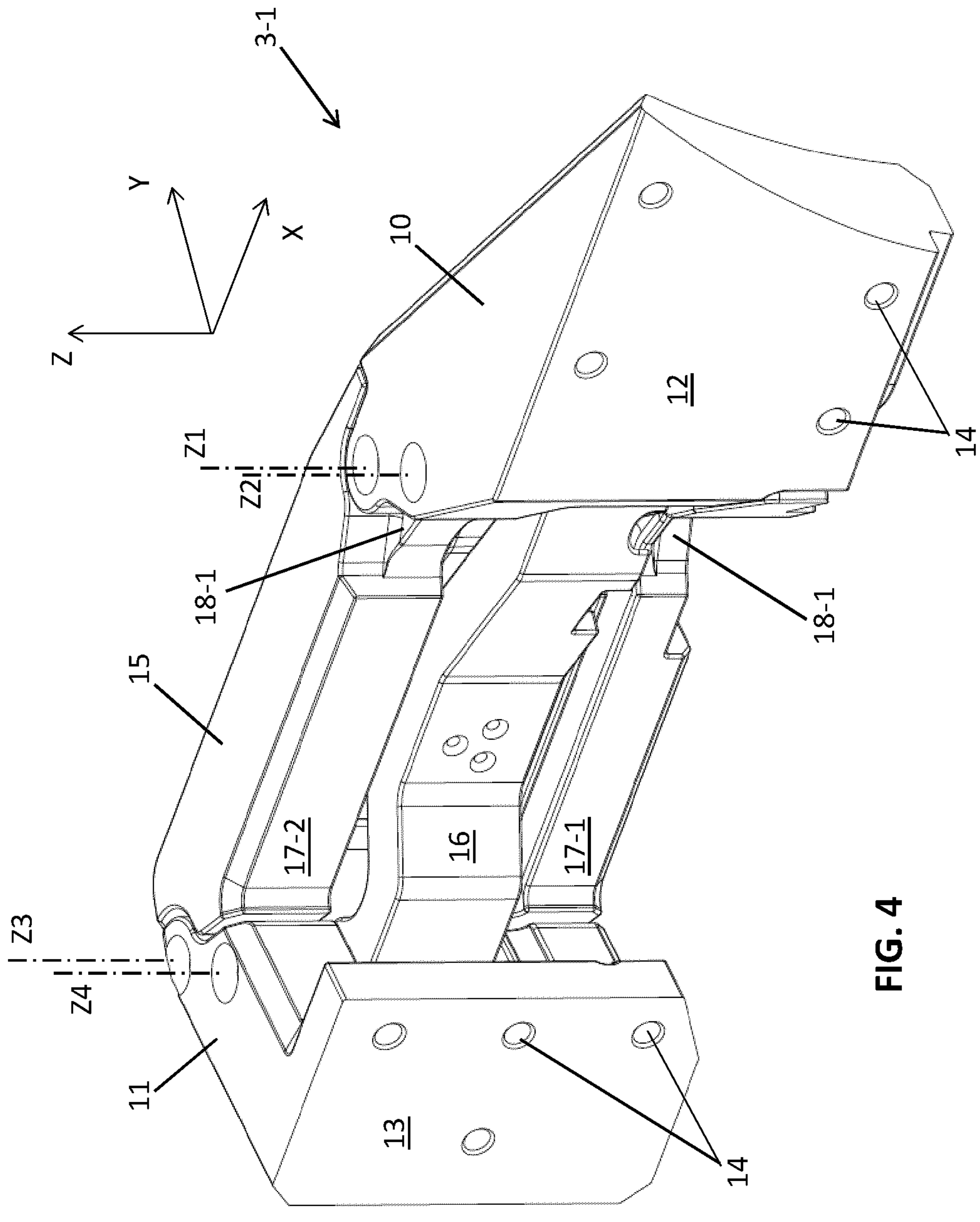
FIG. 4 shows a perspective view of a first hinge apparatus in the door carrier assembly in a first configuration.

The first hinge apparatus 3-1 comprises a latching mechanism 25 for releasably latching the first hinge apparatus 3-1. In the present embodiment, the latching mechanism 25 is operable selectively to latch the first hinge apparatus 3-1 in the first configuration or the second configuration. The latching mechanism 25 is operable to latch the first and second hinge linkage members 15, 16 to each other, thereby inhibiting operation of the first hinge apparatus 3-1. The latching mechanism 25 could comprise an electromechanical mechanism for releasably latching the first and second hinge linkage members 15, 16. In the present embodiment, the latching mechanism 25 comprises an electromagnetic latch. A ferromagnetic plate 26 is disposed on the first hinge linkage member 15; and an electromagnet 27 is disposed on the second hinge linkage member 16. The electromagnet 27 comprises a coil 27 which is controllably energized to generate an electromagnetic force for cooperating with the ferromagnetic plate 26. When the first hinge apparatus 3-1 is in the first configuration, the plate 26 and the electromagnet 27 are juxtaposed with each other. In some embodiments, the electromagnet 27 is disposed in a face-to-face arrangement with a first portion A1 of the plate 26, as shown in FIG. 4. When the first hinge apparatus 3-1 is in the second configuration, the plate 26 and the electromagnet 27 are juxtaposed with each other. For example, the electromagnet 27 is disposed in a face-to-face arrangement with a second portion A2 of the plate 26, as shown in FIG. 6. In a variant, the mounting arrangement of the plate 26 and the electromagnet 27 can be reversed. Alternatively, the plate 26 could be replaced with a second electromagnet or a permanent magnet (not shown) for cooperating with the electromagnet 27.

The electromagnet 27 is selectively energized to generate a magnetic force selectively to latch the first hinge apparatus 3-1 in the first configuration and the second configuration. It will be understood that the latching mechanism 25 can be used to latch the first hinge apparatus 3-1 in the first configuration and the second configuration. The magnetic force generated when the electromagnet 27 is energized may help to displace the first hinge apparatus 3-1 to the first configuration or the second configuration. The electromagnet 27 may be operated to control an operating speed of the first hinge apparatus 3-1. A controller 28 may be provided for controlling the electromagnet 27. The controller 28 may be configured automatically to latch the first hinge apparatus 3-1 when the first hinge apparatus 3-1 is in the first configuration and/or the second configuration. Alternatively, or in addition, the controller 28 may receive a user input to latch or un-latch the vehicle door 4. The controller 28 may optionally control the magnitude of the electrical current supplied to the electromagnet 27 to adjust the magnitude of the latching force. Alternatively, or in addition, controller 28 may optionally control the magnitude of the electrical current supplied to the electromagnet 27 to adjust an opening or closing speed of the vehicle door 4.

Figure 3:
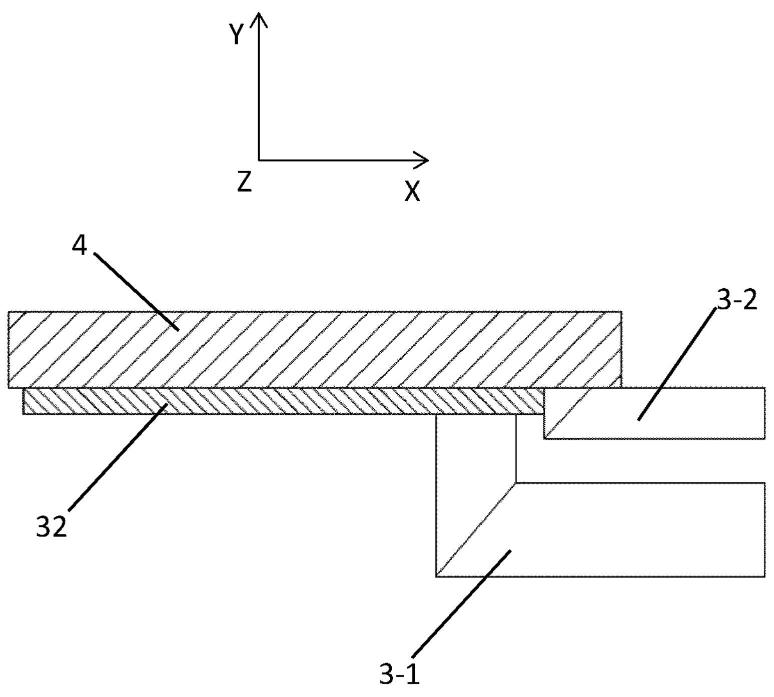
FIG. 3 shows a plan elevation of the door carrier assembly shown in FIG. 2.

The second hinge apparatus 3-2 has the same general configuration as the first hinge apparatus 3-1. The second hinge apparatus 3-2 comprises first and second hinge brackets 10, 11 and first and second hinge linkage members 15, 16. The mounting arrangement of the first and second hinge linkage members 15, 16 in the second hinge apparatus 3-2 is the same. Since the second hinge apparatus 3-2 is not the primary load-bearing hinge, the size of the components may be smaller than the corresponding components of the first hinge apparatus 3-1. The second hinge apparatus 3-2 has at least substantially the same geometry as the first hinge apparatus 3-1. The first and second hinge apparatus 2-1, 3-2 undergo substantially the same movement range when actuated. As shown in FIG. 2, the first and second hinge apparatus 3-1, 3-2 are offset from each other in a vertical direction (i.e. along the Z axis). The first and second hinge apparatus 3-1, 3-2 are also offset from each other a transverse direction (i.e. along the X axis). The second hinge apparatus 3-2 is mounted to the body 5 outboard of the first hinge apparatus 3-1 (i.e. displaced outwardly in a transverse direction), as shown in FIG. 3. In the present embodiment, the first and second hinge apparatus 3-1, 3-2 are also offset from each other in a longitudinal direction. The vehicle door 4 is profiled to accommodate the offset arrangement of the first and second hinge apparatus 3-1, 3-2. The pivot axis Z3-Z4 of the first and second hinge apparatus 3-1, 3-2 are substantially parallel to each other. The second hinge apparatus 3-2 may optionally comprise a second latching mechanism operable to latch the second hinge apparatus 3-2. The latching mechanism may have the same configuration as the latching mechanism 25 described herein in relation to the first hinge apparatus 3-1.

The linear travel assembly 9 is provided to displace the vehicle door from the intermediate position to the open position. As shown in FIG. 2, the linear travel assembly 9 comprises upper and lower linear travel devices 30, 31 for cooperating with upper and lower door slide rails 32, 33 mounted to the vehicle door 4. The upper and lower linear travel devices 30, 31 comprise upper and lower door mounting plates 34, 35 fastened to the first and second hinge apparatus 3-1, 3-2. Upper and lower sets of linear bearings (not shown) are provided for cooperating with the upper and lower door slide rails 32, 33. As shown in FIG. 2, the lower linear travel device 30 comprises a second actuator 36 for displacing the vehicle door 4. The second actuator 36 may, for example, comprise a second electric machine operable to drive a rack and pinion drive arrangement. The controller 28 may optionally control operation of the first actuator 24 and the second actuator 36, for example to control activation of the first and second actuators 24, 36 and a direction of operation. As shown in FIG. 2, a bracing member 37 is provided between the upper and lower door mounting plates 34, 35 to help ensure that they travel together when the second actuator 36 is activated. The bracing member 37 may help to maintain alignment of the vehicle door 4 and reduce or prevent a crabbing motion which may otherwise occur since only the lower linear travel device 30 is driven. A separate latching mechanism may be provided to latch the vehicle door 4 in the open position.

The operation of the door carrier assembly 2 in the opening and closing of the vehicle door 4 will now be described. The vehicle door 4 is initially in the closed position such that the door aperture 6 is closed. The first and second hinge apparatus 3-1, 3-2 are in their respective first configurations. The electromagnet 27 is energized such that the relative movement of the first and second hinge linkage members 15, 16 is inhibited. The operation of the first hinge apparatus 3-1 (and optionally also the second hinge apparatus 2-3) is thereby prevented and the vehicle door 4 is retained in the closed position. The controller 28 receives a user input to open the vehicle door 4. The controller 28 de-energizes the electromagnet 27 to enable relative movement of the first and second linkage members 15, 16. Concurrent with, or after de-energizing the electromagnet 27, the controller 28 activates the first actuator 24 to operate the first hinge apparatus 3-1. The first hinge linkage 15 is drivingly rotated by the first actuator 24 causing the first hinge apparatus 3-1 to be re-configured into the second configuration. The operational loads of the first actuator 24 are transmitted to the second hinge apparatus 3-2, via the bracing member 37 and/or the vehicle door 4, thereby re-configuring the second hinge apparatus 3-2. The vehicle door 4 undergoes translation from the closed position to the intermediate position in which it is spaced apart from the body 3 of the vehicle 1. The controller 28 energizes the electromagnet 27 to inhibit relative movement of the first and second hinge linkage members 15, 16. The first and second hinge apparatus 3-1, 3-2 are thereby latched in the second configuration. The electromagnet 27 may be energized before the first and second hinge apparatus 3-1, 3-2 are in their respective second configurations to provide a closing force to assist the first actuator 24. When the first and second hinge apparatus 3-1, 3-2 are latched in their respective second configurations, the controller 28 activates the second actuator 36 to displace the vehicle door 4 in a longitudinal direction to the open position. This procedure is reversed to displace the vehicle door 4 from the open position to the closed position.

It will be appreciated that the vehicle door 4 may translate forwards or rearwards depending on the location of the first and second hinge apparatus 3-1, 3-2 in relation to the vehicle door 4. In a variant, two (2) vehicle doors 5 could be associated with the door aperture 6. The vehicle doors 5 may be displaced in opposite directions to open and close the door aperture 6.

The door carrier assembly 2 could be modified to incorporate more than two of the hinge apparatus **3-*n* described herein. For example, a third hinge apparatus could be provided between the first and second hinge apparatus 3-1, 3-2**.

It is to be understood that the or each controller 28 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 28 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 28 to implement the control techniques described herein (including some or all of the functionality required for the method described herein). The set of instructions could be embedded in said one or more electronic processors of the controller 28; or alternatively, the set of instructions could be provided as software to be executed in the controller 28. A first controller or control unit may be implemented in software run on one or more processors. One or more other controllers or control units may be implemented in software run on one or more processors, optionally the same one or more processors as the first controller or control unit. Other arrangements are also useful.

The or each controller 28 comprises at least one electronic processor having one or more electrical input(s) for receiving one or more (input signal(s)), and one or more electrical output(s) for outputting one or more (output signal(s)). The or each controller 28 further comprises at least one memory device electrically coupled to the at least one electronic processor and having instructions stored therein. The at least one electronic processor is configured to access the at least one memory device and execute the instructions thereon to implement the method(s) described herein.

It will be appreciated that various changes and modifications can be made to the present disclosure without departing from the scope of the present application.

The door carrier assembly 2 has been described with reference to a vehicle door 4 intended for ingress and egress of a person or persons. It will be understood that the present disclosure is not limited in this respect. The hinge apparatus 3-1, 3-2 described herein could be used in conjunction with other types of door, for example to provide access to a storage compartment (not shown); a tailgate of the vehicle 1; or a bonnet of the vehicle 1. Other applications of the hinge apparatus 3-1, 3-2 are also contemplated.

The first hinge apparatus 3-1 could be modified to utilise a mechanical latch to latch the first and second hinge linkage members 15, 16 when the first hinge apparatus 3-1 is in the first configuration and/or the second configuration. The electromagnet 27 could be energized to release the mechanical latch, for example by disengaging a latching member.

The hinge apparatus **3-*n* has been described herein with reference to an application in a vehicle 1. It will be understood that the hinge apparatus 3-*n* may be used in other applications. For example, the hinge apparatus 3-*n* may be used to mount a door in a building. The hinge apparatus 3-*n* could be used to secure a fire door in a building (which may be controlled via a control system), a door for a professional kitchen (which may be controlled via a person detection control system). The hinge apparatus 3-*n*** may selectively retain the door in open and closed positions.

The invention claimed is:

1. A hinge apparatus for supporting an aperture closure member, the hinge apparatus being configurable in at least a first configuration and a second configuration, the hinge apparatus comprising:
- a first hinge bracket;
- a second hinge bracket;
- a first hinge linkage member pivotally mounted to each of the first and second hinge brackets;
- a second hinge linkage member pivotally mounted to each of the first and second hinge brackets; and
- a latching mechanism operable to latch the first and second hinge linkage members to each other selectively to latch the hinge apparatus in the first configuration and the second configuration;
- wherein the latching mechanism is operable to inhibit movement of the first and second hinge linkage members relative to each other to latch the hinge apparatus, and wherein the latching mechanism comprises at least one electromagnet, the latching mechanism being activated by energizing the at least one electromagnet.

2. The hinge apparatus according to claim 1, wherein the at least one electromagnet is disposed on one of the first and second hinge linkage members.

3. The hinge apparatus according to claim 2, further comprising at least a first ferromagnetic member for cooperating with the at least one electromagnet, the first ferromagnetic member being disposed on the other of the first and second hinge linkage members.

4. The hinge apparatus according to claim 3, wherein the at least one electromagnet and the first ferromagnetic member are disposed adjacent to each other when the hinge apparatus is in the first configuration.

5. The hinge apparatus according to claim 4, wherein the at least one electromagnet and the first ferromagnetic member are disposed adjacent to each other when the hinge apparatus is in the second configuration.

6. The hinge apparatus according to claim 4, further comprising a second ferromagnetic member, wherein the at least one electromagnet and the second ferromagnetic member are located adjacent to each other when the hinge apparatus is in the second configuration.

7. The hinge apparatus according to claim 2, further comprising a controller configured to control operation of the at least one electromagnet.

8. The hinge apparatus according to claim 1, wherein the second hinge bracket is configured to move between a first position and a second position relative to the first hinge bracket as the hinge apparatus is operated, the movement of the second hinge bracket consisting of a translational movement.

9. The hinge apparatus according to claim 1, further comprising a linear travel assembly for mounting the aperture closure member, the linear travel assembly being disposed on the second hinge bracket.

10. The hinge apparatus according to claim 1, wherein the hinge apparatus is a pantographic hinge apparatus.

11. The hinge apparatus according to claim 1, further comprising a first actuator for configuring the hinge apparatus in the first and second configurations.

12. A carrier assembly for mounting an aperture closure member, the carrier assembly comprising at least one hinge apparatus according to claim 1.

13. The carrier assembly according to claim 12, further comprising a first one of the hinge apparatus and a second one of the hinge apparatus, the first and second hinge apparatuses being offset from each other in at least first and second directions.

14. The carrier assembly according to claim 13, wherein a bracing member connects the second hinge bracket of each of the first and second hinge apparatuses.

15. The A carrier assembly according to claim 12, wherein the at least one hinge apparatus comprises a linear travel assembly for mounting the aperture closure member, the linear travel assembly being disposed on the second hinge bracket and the linear travel assembly for providing linear movement of the aperture closure member is disposed on the at least one hinge apparatus.

16. A vehicle comprising at least one carrier assembly according to claim 12.

17. The vehicle as claimed in claim 16, wherein the aperture closure member comprises a vehicle door.

* * * * *